United States Patent

DeRees et al.

[11] Patent Number: 5,806,620
[45] Date of Patent: Sep. 15, 1998

[54] UNITARY ONE-PIECE AUTOMOBILE HOOD, FASCIA, AND FRONT FENDER ASSEMBLY

[75] Inventors: Delbert D. DeRees, Romeo; David J. Kowall, Hartland, both of Mich.

[73] Assignee: Chrysler Corporation, Auburn Hills, Mich.

[21] Appl. No.: 549,663

[22] Filed: Oct. 27, 1995

[51] Int. Cl.[6] .................................................. B62D 25/10
[52] U.S. Cl. ............................ 180/69.21; 180/69.2
[58] Field of Search ........................... 180/69.21, 69.22, 180/69.23, 69.24; 296/193, 194

[56] References Cited

U.S. PATENT DOCUMENTS

| | | | |
|---|---|---|---|
| 872,031 | 11/1907 | Thomas et al. | |
| 1,220,999 | 3/1917 | Booth. | |
| 1,953,515 | 4/1934 | Smith | 296/28 |
| 2,148,950 | 2/1939 | Maier | 296/28 |
| 2,234,781 | 3/1941 | Schjolin | 296/28 |
| 2,254,458 | 9/1941 | Swallow | 296/28 |
| 2,306,416 | 12/1942 | Waterhouse, Jr. | 296/28 |
| 2,362,071 | 11/1944 | Ledwinka et al. | 296/28 |
| 2,380,031 | 7/1945 | Deisley et al. | 296/28 |
| 2,383,029 | 8/1945 | Ulrich | 296/28 |
| 2,637,592 | 5/1953 | Karlby | 296/28 |
| 2,645,519 | 7/1953 | Stanfield et al. | 296/28 |
| 2,656,214 | 10/1953 | Alamagny | 296/28 |
| 2,678,231 | 5/1954 | Barenyi | 296/28 |
| 2,687,325 | 8/1954 | Lindsay | 296/28 |
| 2,693,982 | 11/1954 | Barenyi | 296/28 |
| 2,700,570 | 1/1955 | Barenyi | 296/28 |
| 2,700,571 | 1/1955 | Barenyi | 296/28 |
| 2,710,770 | 6/1955 | Barenyi | 296/28 |
| 2,723,154 | 11/1955 | Barenyi | 296/28 |
| 2,733,096 | 1/1956 | Waterhouse et al. | 296/28 |
| 2,797,952 | 7/1957 | Barenyi et al. | 296/28 |
| 2,797,953 | 7/1957 | Barenyi | 296/28 |
| 2,814,524 | 11/1957 | Porsche et al. | 296/28 |
| 2,841,439 | 7/1958 | Schwenk | 296/28 |
| 2,880,032 | 3/1959 | Barenyi | 296/28 |
| 2,908,528 | 10/1959 | Richter | 296/28 |
| 2,921,812 | 1/1960 | Barenyi | 296/28 |
| 2,973,220 | 2/1961 | White | 296/31 |
| 2,986,423 | 5/1961 | Barenyi | 296/28 |
| 3,003,809 | 10/1961 | Barenyi | 296/28 |
| 3,021,172 | 2/1962 | Fiala et al. | 296/28 |
| 3,037,808 | 6/1962 | Barenyi | 296/28 |
| 3,061,361 | 10/1962 | Barenyi | 296/28 |
| 3,323,608 | 6/1967 | Eggert, Jr. | 180/54 |
| 3,331,627 | 7/1967 | Schroder et al. | 296/31 |
| 3,415,568 | 12/1968 | Gugelot et al. | 296/31 |
| 3,423,122 | 1/1969 | Wessells, III | 296/28 |
| 3,423,123 | 1/1969 | Wessells, III | 296/28 |
| 3,550,948 | 12/1970 | Thompson, Jr. | 296/28 |
| 3,561,813 | 2/1971 | Barenyi et al. | 296/28 |
| 4,205,872 | 6/1980 | Bollinger | 296/205 |
| 4,217,970 | 8/1980 | Chika | 180/298 |
| 4,382,626 | 5/1983 | Spooner | 296/31 P |
| 4,521,049 | 6/1985 | Genma et al. | 296/185 |
| 4,555,134 | 11/1985 | Gruna | 296/189 |
| 4,682,809 | 7/1987 | Huss | 180/31 P |

(List continued on next page.)

OTHER PUBLICATIONS

Triumph Spitfire 1964 http://www.soltec.com/~monzie/spit.htm

*Primary Examiner*—Richard M. Camby

[57] ABSTRACT

An automobile has a plastic body bonded to a steel frame and a plastic molded unitary front end pivotably connected to the frame and releasably connectable by means of elastic straps to the body. The single-piece front end establishes the front hood, left and right front fenders, and front fascia of the automobile, thereby minimizing body joints and simplifying assembly. The front end can be pivoted at a pivot point located near the front fascia to a drive position to cover the engine of the automobile. In the drive position, a rear edge of the front end is closely spaced from the body, and the front end can be engaged with the body by means of the elastic straps. Further, the straps can be released from the body and the front end pivoted to a maintenance position, wherein the rear edge of the front end is distanced from the body to permit access to the engine of the automobile.

11 Claims, 1 Drawing Sheet

U.S. PATENT DOCUMENTS

| | | | |
|---|---|---|---|
| 4,804,199 | 2/1989 | Picard | 280/33 |
| 4,842,326 | 6/1989 | Divito | 296/196 |
| 4,865,378 | 9/1989 | Filtri et al. | 296/197 |
| 4,940,282 | 7/1990 | Townsend | 296/204 |
| 5,002,309 | 3/1991 | Vecellio . | |
| 5,004,082 | 4/1991 | Foot | 298/190 |
| 5,011,217 | 4/1991 | Simpson et al. | 296/203 |
| 5,094,313 | 3/1992 | Mauws | 180/210 |
| 5,314,230 | 5/1994 | Hutchison et al. | 180/203 |

UNITARY ONE-PIECE AUTOMOBILE HOOD, FASCIA, AND FRONT FENDER ASSEMBLY

CROSS-REFERENCE TO RELATED APPLICATIONS

This application is related to co-pending U.S. patent application Ser. No. 08/540,297, for an invention entitled "Motor Vehicle Body", and to co-pending U.S. patent application Ser. No. 08/545,971, for an invention entitled "METHOD AND APPARATUS FOR ATTACHING COMPOSITE PLASTIC AUTOMOBILE BODY TO STEEL AUTOMOBILE FRAME", both of which are commonly assigned herewith and incorporated herein by reference.

FIELD OF INVENTION

The present invention relates generally to automobiles, and more particularly to lightweight automobile bodies.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More particularly, the present invention is intended to complement the inventions disclosed in the above-referenced patent applications in providing a low-cost, effective automobile having a plastic body in which the number of individually molded components is minimized. The present invention recognizes that a molded plastic body is both lightweight, compared to metal automobile bodies, and relatively inexpensive.

As further recognized by the present invention, an advantage in constructing an automobile body out of plastic is that the total number of individual body parts can be reduced, compared to steel-bodies automobiles. This is because plastic can be injection molded in relatively large unitary configurations. By minimizing the number of molded components, the present invention recognizes that assembly costs are reduced. Additionally, by minimizing the number of molded components, the number of body joints and concomitant potential for misalignment between joined body parts is also reduced.

Accordingly, it is an object of the present invention to provide a plastic automobile body which includes only a few individually-molded body parts. Another object of the present invention is to provide a unitarily-molded portion of a plastic automobile body which establishes the entire front portion of the body. Still another object of the present invention is to provide a plastic automobile body portion which minimizes the number of body component joints. Yet another object of the present invention is to provide a plastic automobile body portion that is easy to use and cost-effective.

SUMMARY OF THE INVENTION

An automobile including an engine further includes a body and a steel frame. A unitarily constructed plastic molded front end is pivotably attached to the frame and is releasably engaged with the body to selectively cover the engine.

Preferably, left and right latches are attached to the front end and left and right attachment elements are mounted on opposed sides of the body. The attachment elements respectively releasably engage the left and right latches. In one preferred embodiment, each latch includes an elastic strap attached to the front end and a handle attached to the strap. In accordance with the present invention, the handle can be manipulated to releasably engage the handle with the respective attachment element.

As envisioned by the present invention, the front end establishes a front hood section. Moreover, the front end establishes left and right front fender sections which depend downwardly from the front hood section. Still further, the front end establishes a front fascia section that depends downwardly from the front hood section and is oriented generally orthogonally to the left and right fender sections. Preferably, the front fascia section in turn establishes a front air dam, with the front hood establishing a rear edge of the front end.

Left and right pivot brackets advantageously are attached to the front fascia section, and left and right frame brackets are attached to the frame. The frame brackets rotatably engage the pivot brackets. Consequently, the front end is pivotable relative to the frame to a drive position, wherein the rear edge of the front end is juxtaposed with the body and the latches can be engaged with the attachment elements to hold the front end in the drive position to cover the engine. Additionally, the front end can be pivoted to a maintenance position, wherein the rear edge is distanced from the body to thereby establish access to the engine. In a presently preferred embodiment, the pivot brackets are distanced from the rear edge. Desirably, at least one pad is connected to the front end adjacent the rear edge for contacting the body when the front end is in the drive position.

In another aspect of the present invention, a method is disclosed for establishing the body of an automobile having a steel frame. The method of the present invention includes attaching a plastic body to the frame. Also, the method includes molding a unitary front end from plastic, the front end establishing at least a front hood section, downwardly depending left and right fender sections, and a downwardly depending fascia section. Per the present invention, the front end is pivotably connected to the frame and releasably connected to the body.

In still another aspect of the present invention, a body portion for a vehicle includes a unitarily molded plastic front end. The front end of the present is formed with a front hood section that generally defines a plane and that is bounded by opposed left and right longitudinal edges and opposed front and rear transverse edges. Also, the front end is formed with left and right fender sections which depending downwardly from the plane substantially from the left and right edges, respectively. Still further, the front end is formed with a front fascia section which depends downwardly from the plane substantially from the front edge.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

In the discussion below, orientations of "front", "rear", "transverse", "longitudinal", etc. are referenced to the automobile of the present invention.

Figure 1:
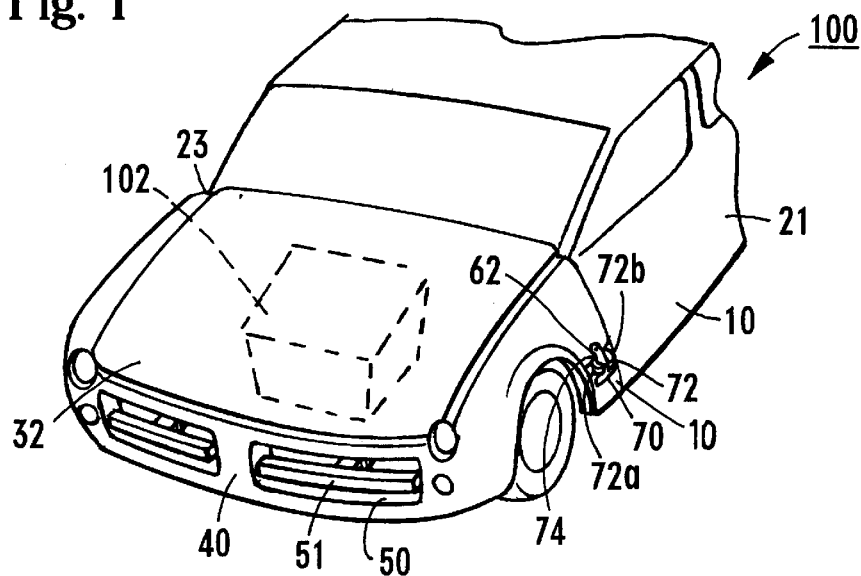
FIG. 1 is a perspective view of the composite plastic automobile body of the present invention shown attached to a steel frame, with portions broken away.

Referring initially to FIG. 1, an automobile body 10 is shown attached to a steel automobile frame 12 for inclusion in an automobile, generally designated 100, having a motor 102 operably engaged therewith. Preferably, the automobile body 10 is made of a plastic composite material by injection molding, as described in the first of the above-referenced patent applications. The details of the preferred structure of attaching the body 10 to the frame 12 is fully disclosed in the second of the above-referenced patent applications.

Figure 2:
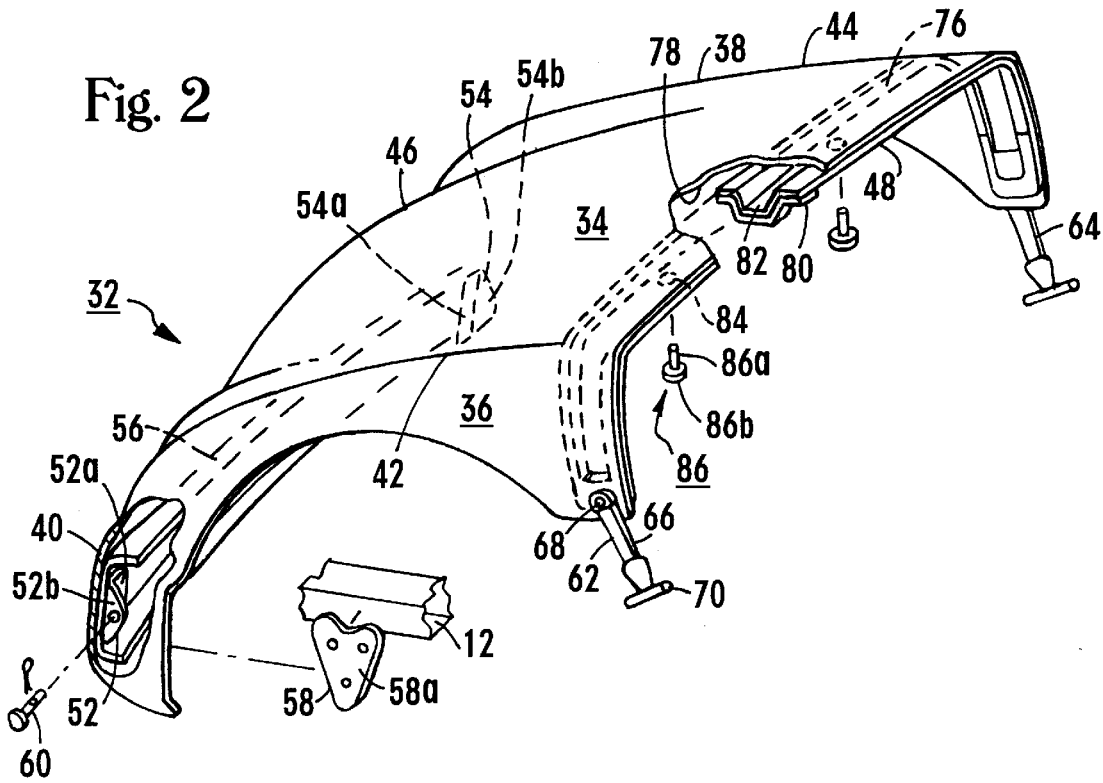
FIG. 2 is a perspective view of the unitary front end of the present invention, with portions cut away, portions shown in phantom, and with the frame exploded from the front end.

Additionally, the body 10 of the automobile 100 includes a unitarily-molded (and, thus, single piece) plastic front end 32. FIG. 2 best shows the details of the front end 32 of the present invention.

As shown in FIG. 2, the front end 32 establishes a plurality of body parts which conventionally are established in steel-bodied automobiles by separately manufactured parts. More particularly, as shown the single-piece front end 32 includes a front hood section 34, left and right fender sections 36, 38, and a front fascia section 40.

FIG. 2 shows that the front hood section 34 generally defines a plane that is horizontal to the ground when the front end 32 is in a drive position, shown in FIG. 1. As shown, the front hood section 34 is bounded by opposed left and right longitudinal edges 42, 44 and opposed front and rear transverse edges 46, 48. The left and right fender sections 36, 38 depend downwardly from the plane of the front hood 34 substantially from the left and right edges 42, 44, respectively. Likewise, the front fascia section 40 depends downwardly from the plane of the front hood section 34 substantially from the front edge 46. As shown, the fascia section 40 is oriented generally orthogonally to the left and right fender sections 36, 38.

In accordance with the preferred embodiment shown, the front fascia section 40 can also, if desired, be formed with one or more front air dam apertures 50, shown best referring briefly back to FIG. 1. It may readily be appreciated that the air dam apertures 50 establish an air dam through which air outside the automobile 100 is directed against the engine 102 (FIG. 1) to cool the engine 102. Although the air dam apertures are generally rectangularly shaped as shown, it is to be understood that other shapes may be used, depending on the configuration of the engine compartment of the particular automobile and the particular cooling needs of the engine 12. Bumper portions 51 of the frame 12 protrude through the apertures 50 slightly beyond the fascia section 40 to establish a front bumper of the automobile 100.

Per the present invention, the front end 34 is pivotably attached to the frame 12. More specifically, the front end 34 can be moved to the drive position shown in FIG. 1, wherein the rear edge 48 is juxtaposed with left and right sides 21, 23 of the body 10, and to a maintenance position, wherein the rear edge 48 is distanced from the body sides 21, 23 to thereby establish access to the engine 102.

Referring back to FIG. 2, to provide for pivotal movement of the front end 34, left and right pivot brackets 52, 54 (bracket 54 shown in phantom) are attached to the front fascia section 40. If desired, a generally rail-shaped transverse metal or plastic fascia strength member 56 (also shown in phantom) can be bonded to the fascia section 40 to strengthen the fascia section 40. Frontwardly-oriented surfaces 52a, 54a of the pivot brackets 52, 54 in turn are attached to the fascia section 40, preferably by bolting the surfaces 52a, 54a to the fascia section 40.

Further, identically-configured left and right frame brackets (only the left bracket 58 shown in FIG. 2) are bolted to the frame 12. Taking the left frame bracket 58 as an example, a longitudinally-oriented surface 58a of the left frame bracket 58 is positioned flush against a longitudinally-oriented surface 52b of the left pivot bracket 52, and a left cotter pin 60 extends through both brackets 52, 58 to rotatably couple the brackets. The right frame bracket is likewise coupled to the right pivot bracket 54.

With this combination of structure, the front end 34 is pivotably engaged with the frame 12. It will be appreciated that the pivot point of the front end 34 relative to the body sides 21, 23 is distanced from the rear edge 48. In an alternate embodiment, the pivot pin 60 can be replaced with a nut and bolt arrangement which does not tightly urge the left brackets 52, 58 together, to facilitate rotational motion between the brackets 52, 58.

To hold the front end 34 in the drive position shown in FIG. 1, left and right latches 62, 64 are attached to the left and right fender sections 36, 38, respectively, and the latches 62, 64 can be releasably engaged with the left and right sides 21, 23, respectively, of the body 10. For purposes of clarity of disclosure the configuration and operation of the left latch 62 will be described below, but it is to be understood that the right latch 64 is identical in operation and configuration to the left latch 62.

In the specific embodiment shown, using the left latch 62 as an example, the left latch 62 includes an elastic rubber strap 66, a front end of which is attached to the left front fender section 36 by a rivet 68. Alternatively, the elastic strap can be bolted to the fender section 36.

Moreover, the left latch 62 includes a rigid, generally solid cylindrical plastic or wood handle 70 which is attached to the elastic strap 66 by means well-known in the art. Referring briefly back to FIG. 1, a rigid plastic or metal left attachment element 72 is bonded to the left side 21. In one presently preferred embodiment, the left attachment element includes two arms 72a, 72b which are distanced from each other to establish a clearance 74 therebetween.

It can readily be appreciated in reference to the figures that the handle 70 can be grasped to stretch the elastic strap 66 sufficiently to position the strap 66 through the clearance 74. The handle 74 can then be released, to trap the handle 70 against the arms 72a,b of the attachment element 72, thereby holding the front end 34 in the drive position.

To move the front end 34 to the maintenance position, the handle can be manipulated to move the strap 66 out of the clearance 74 and consequently disengage the handle 70 from the attachment element 72. In other words, the handle 70 can be manipulated to releasably engage the handle 70 with the attachment element 72. Once the latches 62, 64 have been released from their respective attachment elements, the front end 34 can manually be pivoted to the maintenance position.

Referring back to FIG. 2, to strengthen the front end 34 about its rear edge 48, a generally U-shaped metal or plastic hood and fender strength strip 76 is preferably bonded to a bottom surface 78 of the front section 34. As shown, the strength strip 76 generally conforms to the contour of the rear edge 48. Moreover, a rear edge 80 of the strength strip 76 is substantially flush with the rear edge 48 of the front end 34.

As discussed above, the strength strip 76 defines an overall U-shape, i.e., in transverse cross-section relative to the automobile 100, the strength strip is shaped as a large, somewhat flat "U". FIG. 2 additionally shows that the strength strip 76 is U-shaped in longitudinal cross-section relative to the automobile 100, to add structural rigidity to the strength strip 76. As a consequence of the above-described configuration, the strength strip 76 defines a transversely-extending elongated channel 82.

Continuing with the description of the structure shown in FIG. 2, a plurality of threaded bosses 84 are formed during molding in the strength strip 76. If desired, the bosses 84 may be replaced by internally-threaded nuts (not shown) which are bonded or otherwise attached to the strip 76. A plurality of bumpers 86 are provided, and each bumper 86 includes a threaded shaft 86a which is threadably engaged with a respective boss 84. Furthermore, each bumper 86 includes a rubber or soft plastic pad 86b for gently contacting abutting structure when the front end 34 is in the drive position shown in FIG. 1.

While the particular UNITARY ONE-PIECE AUTOMOBILE HOOD, FASCIA, AND FRONT FENDER ASSEMBLY as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method for establishing a portion of the body of an automobile having a body frame, said body frame including at least one front bumper, and body sides, the method comprising the steps of:

(a) providing a one-piece front end panel, the front end panel establishing at least a front hood section, downwardly depending left and right fender sections, and a downwardly depending fascia section, the fascia section depending downwardly below the bumper;

(b) pivotably connecting the front end to said body frame at the front facia section and below the bumper; and (c) releasably connecting the front end to the body sides.

2. An automobile including an engine, comprising:

a body frame;

a bumper attached to said body frame;

a body defining a left side and a right side, both attached to said body frame; and a one-piece front end panel pivotably attached to said body frame and releasably engaged with the body sides to selectively cover the engine, the front end panel including a front fascia section extending downwardly below the bumper;

left and right latches attached to said front end; and left and right attachment elements mounted on the left and right sides, respectively, for respectively releasably engaging the left and right latches.

3. An automobile including an engine, comprising:

a body frame;

a bumper attached to said body frame;

a body defining a left side and a right side, both attached to said body frame; and a one-piece front end panel pivotably attached to said body frame and releasably engaged with the body sides to selectively cover the engine, said front end panel further including a front fascia section extending downwardly below the bumper, a front hood section establishing a rear edge of the front end panel, and left and right front fender sections depending downwardly from the front hood section, wherein said front fascia section is oriented generally orthogonally to the left and right front fender sections.

4. An automobile including an engine, comprising:

a body frame;

a bumper attached to said body frame;

a body defining a left side and a right side, both attached to said body frame; and a one-piece front end panel pivotably attached to said body frame and releasably engaged with the body sides to selectively cover the engine, the front end panel including a front fascia section extending downwardly below the bumper;

left and right latches attached to said front end; and left and right attachment elements mounted on the left and right sides, respectively, for respectively releasably engaging the left and right latches.

5. The automobile of claim 4, wherein the automobile further comprises left and right pivot brackets attached to the front fascia section, and left and right frame brackets attached to the frame for rotatably engaging the left and right pivot brackets, respectively, such that the front end is pivotable relative to the frame between a drive position, wherein the rear edge of the front end is juxtaposed with the left and right sides, and a maintenance position, wherein the rear edge is distanced from the sides to thereby establish access to the engine.

6. The automobile of claim 5, wherein the pivot brackets are distanced from the rear edge.

7. The automobile of claim 6, further comprising at least one pad connected to the front end adjacent the rear edge for contacting one of the sides when the front end is in the drive position.

8. The automobile of claim 4, wherein said front fascia section establishes a front air dam.

9. The automobile of claim 8, wherein the air dam includes at least one opening formed therein through which the bumper protrudes.

10. The automobile of claim 9, wherein the air dam includes a pair of openings and the vehicle includes two bumpers, one of said bumpers protruding through each air dam opening.

11. The automobile of claim 5, wherein the frame bracket and pivot bracket establish a pivot point about which the front end panel pivots, the pivot point being below the vehicle bumper.

\* \* \* \* \*